Nov. 19, 1940.                R. B. BARNES                 2,222,470
     METHOD OF PRELIMINARILY CURING A HEAT CONVERTIBLE RESINOUS MATERIAL
                    Filed May 27, 1938          6 Sheets-Sheet 1

INVENTOR
ROBERT B. BARNES,
BY Ellis S. Middleton
ATTORNEY.

Nov. 19, 1940.    R. B. BARNES    2,222,470
METHOD OF PRELIMINARILY CURING A HEAT CONVERTIBLE RESINOUS MATERIAL
Filed May 27, 1938    6 Sheets-Sheet 4

FIG. 3.

INVENTOR.
ROBERT B. BARNES,
BY Ellis S. Middleton
ATTORNEY.

Nov. 19, 1940.   R. B. BARNES   2,222,470
METHOD OF PRELIMINARILY CURING A HEAT CONVERTIBLE RESINOUS MATERIAL
Filed May 27, 1938    6 Sheets-Sheet 5

INVENTOR.
ROBERT B. BARNES,
BY
ATTORNEY.

Patented Nov. 19, 1940

2,222,470

UNITED STATES PATENT OFFICE 2,222,470

METHOD OF PRELIMINARILY CURING A HEAT CONVERTIBLE RESINOUS MATERIAL

Robert Bowling Barnes, Stamford, Conn., assignor to American Cyanamid Company, New York, N. Y., a corporation of Maine Application May 27, 1938, Serial No. 210,418

5 Claims. (Cl. 265—11)

The present invention relates to a method of preliminarily curing a heat convertible resinous material, that is, for progressively following changes in physical and chemical properties of heat-convertible plastic resins or polymers while they are undergoing further polymerization and/or oxidation, from which the chemical and/or physical properties of the plastic may be ascertained, thus serving as a useful control for the manufacture of such substances.

The invention is particularly applicable in following such polymerization and/or oxidation of alkyd resins and of linoleum cements, although not limited thereto, as obviously the invention will be found useful for any other convertible plastic substance in which, during processing, its physical and chemical properties progressively change.

Alkyd resins are ordinarily prepared by reacting polybasic acids with polyhydric alcohols with or without drying oils and/or drying oil acids. The reaction is carried out by heating the constituents in such a manner that water is lost during processing. The temperature range during treatment may lie between 150° C. and 290° C. This part of the method is ordinarily carried out in a directly heated kettle, facilities being provided for a definite control of temperature and agitation as well as for the condensation of the water of esterification lost during the process.

Various refinements may be utilized in the above process, such as carrying out the reaction in a non-oxidizing atmosphere in order to prevent discolorization and premature gelation of the drying oil constituents. The non-oxidizing atmosphere is also conducive in allowing esterification to proceed to its maximum extent. Under such conditions, the resinous material so formed is a polyester. When the resin contains drying oil constituents or other unsaturated constituents, it is sensitive to oxygen and when exposed thereto a gelation or drying action may occur prematurely unless non-oxidizing conditions are maintained.

This kettle treatment is ordinarily continued until the material has reached a certain state, readily determinable by acid number, viscosity or other known tests, from which point the partially treated material is, for some purposes, transferred to a mixing device where further polymerization and/or oxidation is induced. This change is carried out while the material is being agitated, at temperatures generally materially lower than those prevailing in the kettle. This treatment in the mixer is ordinarily continued until the resinous material has become cured to the extent desired for the use to which the resin is to be put.

The present invention is concerned with a method for progressively following the changes in physical and chemical properties brought about during polymerization and/or oxidation taking place in the mixer so that the physical and chemical properties of the material undergoing treatment may be properly controlled and the degree of cure for any particular time made known. This is highly desirable because such resins are particularly sensitive and an over or under treatment in the mixer may result in undesirable properties making themselves manifest.

Various methods have been proposed heretofore for determining the state of polymerization and/or oxidation of a resinous material undergoing treatment in the mixer but inasmuch as during the test the treatment is being continued it is imperative that the test method used be one which will accurately determine the physical or chemical properties at any particular moment quickly. All other methods of which I am aware have been unsatisfactory either due to the fact that the test period was an excessive one or the test method involved the human element to such a degree that a desirable accuracy could not be obtained.

It is the principal object of this invention, therefore, to devise a method wherein the state of polymerization and/or oxidation of a resinous material as reflected by its physical properties may be accurately and quickly determined at any particular moment. If then this figure is plotted against the time of the process, a curve will result from which one is able to ascertain the variations of chemical and physical properties produced by the conditions imposed.

It has been found that the extent to which a resinous material may spread in a film under curing conditions may be used as an index of the state of its physical and chemical properties during polymerization and/or oxidation. It is proposed, therefore, to use this property in arriving at the curve above mentioned.

The invention, therefore, in its broadest aspect contemplates sampling the resinous material undergoing oxidation or polymerization and heat curing the same while permitting it to spread as a film to its maximum extent under the action of a predetermined or standardized weight for a predetermined or standardized time. The area of the spread and cured resin is then measured and this figure or a multiple thereof plotted against the time of processing. Upon repetition of this procedure, a curve will result from which the degree of oxidation and/or polymerization of the resin undergoing treatment may be ascertained.

The invention further consists in the novel steps of the method more fully hereinafter described and shown in the accompanying drawings.

In the drawings—

Figs. 1—A to 1—F are curves illustrating the examples given;

Referring now with particularity to the details of the method employed in the accomplishment of the objects of the invention, a more or less detailed dissertation of the factors involved will be helpful.

*Taking the sample*

The oxidation reaction as ordinarily accomplished in this art takes place in a piece of equipment commonly termed an "oxidizer", but which is in fact a mixing device so arranged as to permit contact of the resinous material undergoing treatment with atmospheric oxygen. This piece of equipment usually consists of a casing containing a plurality of parallel shafts extending therethrough and equipped with plates advancing towards each other by reason of opposite rotational movement of the shafts carrying them. Other forms of mixers may, of course, be used, it being only important that thorough agitation of the resinous material undergoing treatment be accomplished in contact with oxygen so as to maintain a uniform and thorough mixing. Inasmuch as the invention is not concerned in any way with the type of mixing device, it is not shown in the drawings.

In taking the sample from the mixer or oxidizer, it is important that it be a homogeneous one. The homogeneous sample having been taken, if the testing device is removed to any extent from the mixer, the sample, of course, must be protected against oxidation for any chemical change which occurs between the time of sampling and the time of curing will introduce an error into the final figure.

In determining the size of sample to test, various factors must be taken into consideration such as the size of the transparent plates used, the force with which the plates are to be pressed together, the curing temperature and the area of the finally pressed and cured resinous film to be measured. Experience has demonstrated that the most convenient weight to sample is approximately 0.25 gram.

*The plates*

Any type of plates may be used which will permit of progressive advancement towards each other to squeeze the resinous material therebetween, which will stand up under the temperature used without distortion, which will permit a thorough weighting or contact by and with the resinous material and will permit of a reading of the area of the eventual film. For this purpose, I have found that under all circumstances, two rectangular glass plates are admirably adapted to accomplish the results sought for. These may be of any dimension, although I prefer plates approximately 4 inches by 3½ inches and about $48/1000$ of an inch thick. The weighed sample is then placed in the center of one of these plates and introduced into the oven.

*The oven assembly*

This piece of equipment comprises an oven suitably insulated and provided with heating means for maintaining it at a predetermined uniform temperature. Within the oven is a block or anvil preferably of metal, above which the plate containing the resinous sample is placed. Above the anvil is what may be termed an upper jaw provided with a holder for receiving the second or upper plate out of contact with the sample which rests on the lower plate. The two plates having been introduced as above, means are provided for gradually lowering the upper jaw and its plate until the latter contacts with the weighed sample. Further movement in a downward direction of the upper jaw results in deforming the sample and spreading it as a more or less circular film between the two plates. It is desirable during this film forming operation that the resinous material be permitted to flow freely under the action of a weight, rather than under that of a mechanically applied pressure. Experience has demonstrated that this weight should be such as to give to the sample maximum flow at the temperature used. There is a weight figure which, if used, will not induce complete flow of the resinous material prior to its cure. On the other hand, there is an optimum weight above which no larger amount will induce any more flow of the resinous material. Consequently, any weight above that critical one found to induce maximum flow is satisfactory. Experiments have demonstrated that a weight of 4.5 kilograms is within the range of that which will induce maximum flow.

If, then, this weighted upper jaw is gradually released so that it can move freely downwardly on top of the upper plate, the resinous sample will be gradually squeezed into a film between the plates.

In producing this resinous film, it is important that when the final area has been reached, the resin shall be in a cured state. Inasmuch as it is important also that the curing and spreading take place in a minimum length of time because the treatment of the main batch of resinous material is continuing, a temperature is employed in the oven which will give a cure in a minimum length of time. A convenient temperature has been found to be approximately 200° C. If this temperature is exceeded, the time of cure will, in many cases, be shortened so that a complete cure will be effected before the resin has had opportunity for maximum flow. The temperature of 200° C., therefore, represents one which in most cases will permit maximum flow of the resinous material to take place without effecting a cure during its period of flow.

As above stated, it is important that the period of time within which the cure of the resinous material between the plates takes place shall exceed that required for the resinous material to reach its greatest area of flow for the temperature and weight used. Under the above conditions, it has been found that a period of five minutes meets these requirements. This period has been found to exceed the period of flow sufficiently to insure cure. However, the character of the resinous material under test will determine whether this period should be lengthened or not, it being only important that the length of time to which the material under test is subjected to heat and pressure shall exceed that required for maximum flow.

Measurement of flow area

The test material having been permitted to take its maximum flow and having been cured as above set forth, the two plates are then removed from the oven and the area occupied by the resinous film measured. This may be done by any desired means, although it has been found that the instrument known as a planimeter is admirably adapted to this purpose. Inasmuch as the preferred form of plates is transparent, they may be positioned between a light source and the instrument and the area readily measured. Preferably the plates are so positioned with respect to a light source as to cast a shadow onto a piece of frosted glass and the area of the shadow measured by the planimeter. Under these circumstances, the instrument will give direct the area of the film in square inches.

Plotting the curve

A curve may now be obtained from points by plotting the area found as above, against time. In some instances, the area or planimeter figure may be squared in order to obtain a better range for the curve.

Example A

Figure 1A:
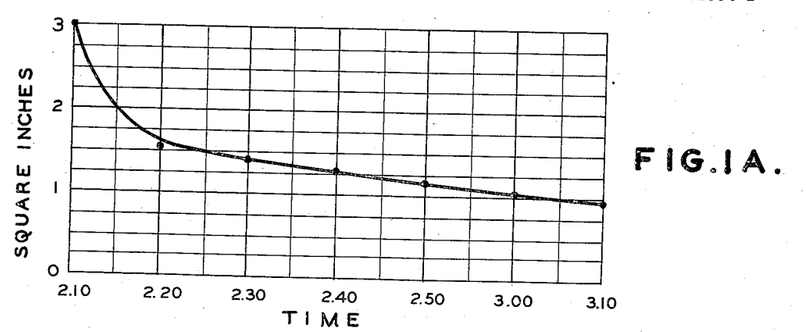

A resinous material was transferred from the kettle to the mixer and a sample tested as above at 1:40 P. M. At that time, insufficient physical and/or chemical change in the material had taken place because under the action of heat and pressure in the oven, the resin was so fluid the film occupied the same area as the plates. Further planimeter readings are indicated on the table below. Curve A is plotted from these figures.

| Time | Planimeter readings |
|---|---|
| 2:10 | 3 |
| 2:20 | 1.55 |
| 2:30 | 1.42 |
| 2:40 | 1.27 |
| 2:50 | 1.16 |
| 3:00 | 1.1 |
| 3:10 | 0.99 |

The figure shows that a well defined curve may be constructed from these figures and that at any time after 2:40, the condition of the resinous material could have been predicted.

Example B

Figure 1B:
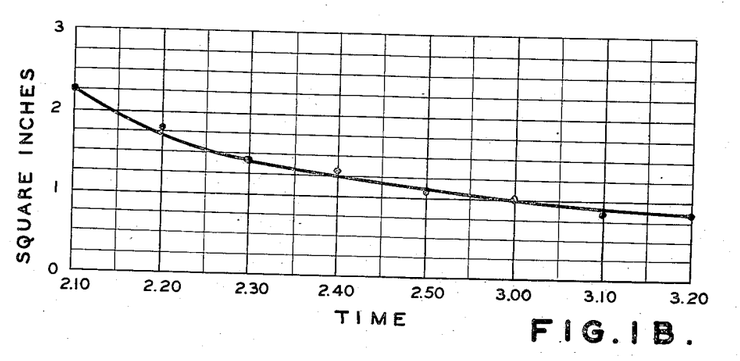

A test made at 1:40 showed insufficient physical and chemical change had taken place. The table below shows the periodic results obtained after that time:

| Time | Planimeter readings |
|---|---|
| 2:10 | 2.25 |
| 2:20 | 1.81 |
| 2:30 | 1.42 |
| 2:40 | 1.32 |
| 2:50 | 1.08 |
| 3:00 | 1. |
| 3:10 | 0.85 |
| 3:20 | 0.9 |

The curve B constructed from the above indicates that the physical and chemical properties of the resin may be readily followed during the processing and that at any time after 2:30 or 2:40 the properties at a later stage could have been predicted.

The following additional examples illustrate the principle involved:

Example C

Figure 1C:
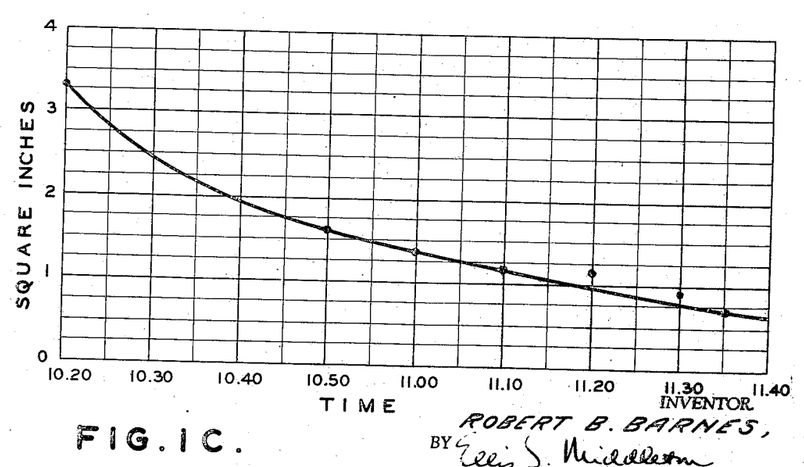

| Time | Planimeter readings |
|---|---|
| 10:20 | 3.27 |
| 10:50 | 1.65 |
| 11:00 | 1.37 |
| 11:10 | 1.2 |
| 11:20 | 1.21 |
| 11:30 | 0.91 |
| 11:35 | 0.69 |

Example D

Figure 1D:
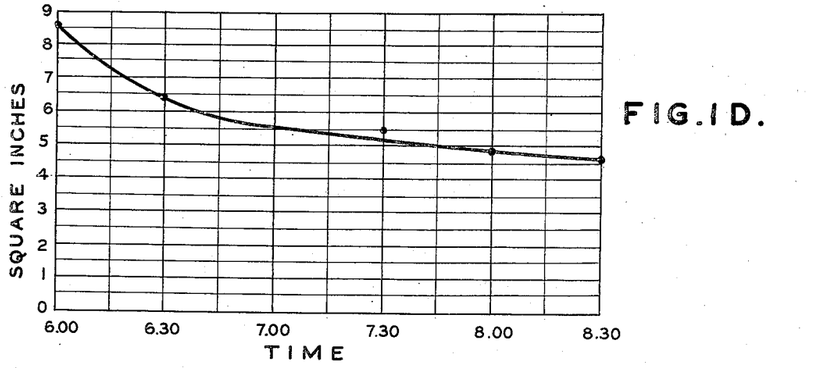

| Time | Planimeter readings |
|---|---|
| 6:00 | 8.5 |
| 6:30 | 6.4 |
| 7:30 | 5.45 |
| 8:00 | 4.87 |
| 8:30 | 4.7 |

Example E

Figure 1E:
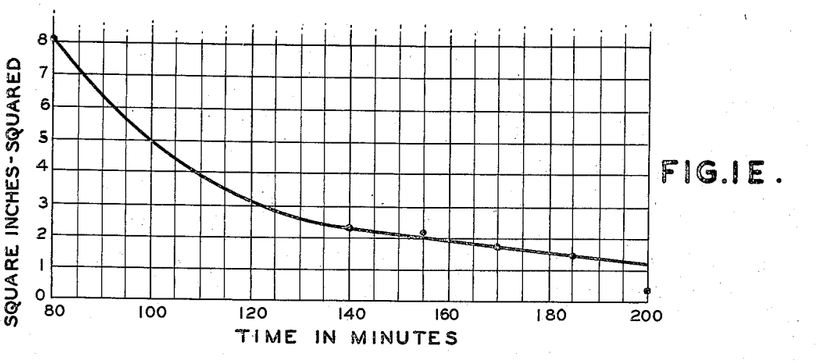

In this example, the abscissa represents the time of treatment in minutes and the ordinate the planimeter reading squared. The curve was constructed from the following points:

| Minutes | Planimeter readings squared |
|---|---|
| 80 | 8.17 |
| 140 | 2.31 |
| 155 | 2.19 |
| 170 | 1.74 |
| 185 | 1.46 |
| 200 | .38 |

*Example F*

Figure 1F:
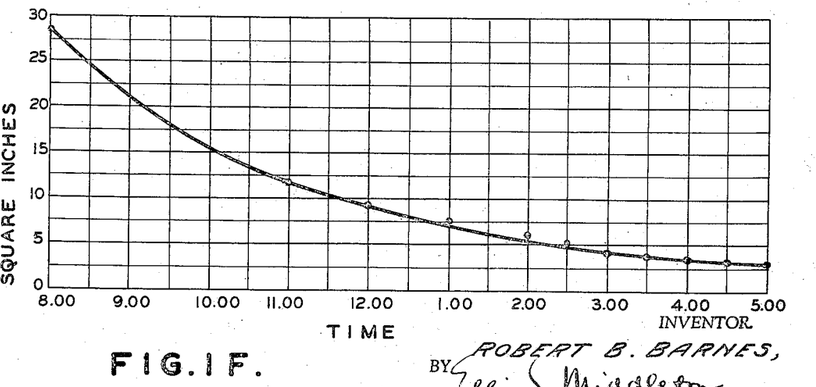

| Time | Planimeter readings |
|---|---|
| 8:00 | 28.2 |
| 9:20 | 24.05 |
| 11:00 | 11.82 |
| 12:00 | 9.23 |
| 1:00 | 7.29 |
| 2:00 | 6.12 |
| 2:30 | 5.2 |
| 3:00 | 4.75 |
| 3:30 | 4.42 |
| 4:00 | 4.07 |
| 4:30 | 3.69 |
| 5:00 | 3.5 |

It is, of course, to be understood that the treatment of the resinous material was stopped when, from the curve, the presence of the desired physical and chemical properties was indicated. By plotting such a curve based upon the film forming characteristics, the physical and chemical characteristics at any point during the treatment may be predicted and the substance pulled at any desired time.

In determining the plotting points on the above curves, it is to be understood that they are not always as accurate as above indicated because the material undergoing test is constantly changing its chemical and physical characteristics, particularly inasmuch as the test is being conducted under a comparatively high temperature. During the period at which flow is taking place, curing is also occurring and, consequently, the figure obtained from any particular test theoretically cannot possibly reflect 100% the actual conditions obtaining in the batch from which the sample was taken. However, experience has demonstrated that this method is remarkably accurate and that plotting points may be thus obtained which, for commercial purposes, admirably accomplish the result sought for.

Figure 2:
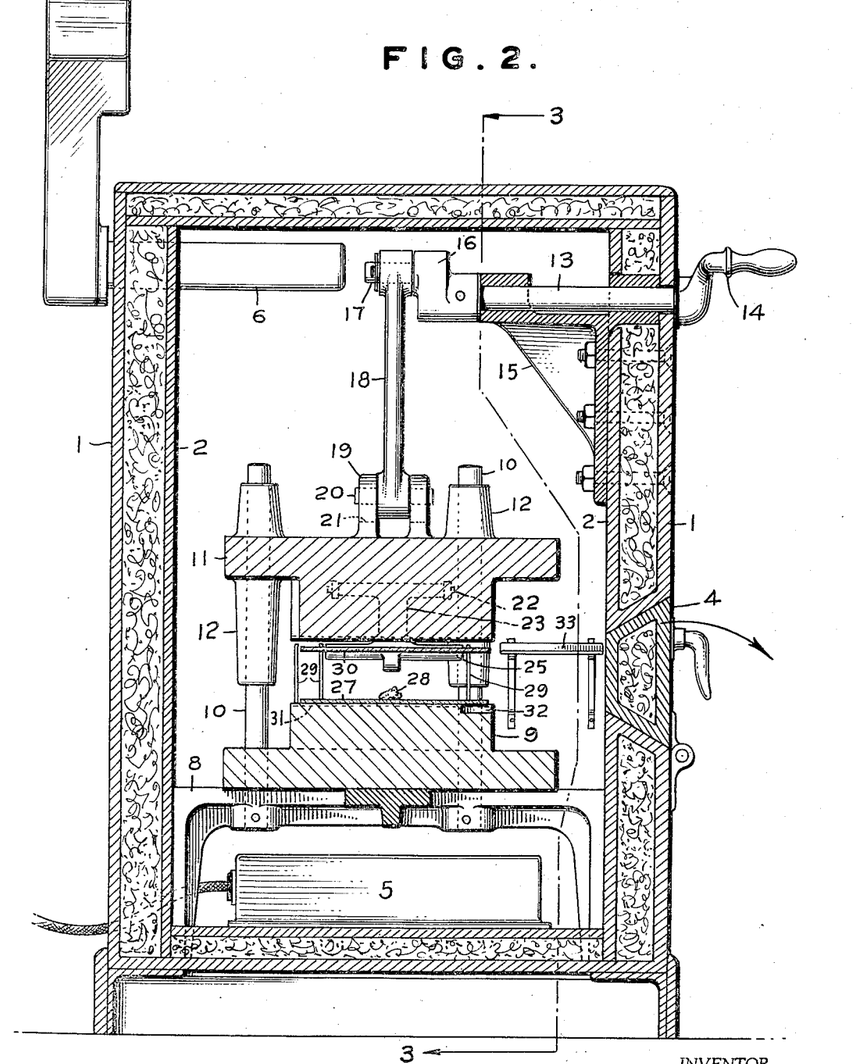
Fig. 2 is a side view partly in section of an assembly for carrying out the present invention.

The oven within which the resinous samples are tested under heat and pressure will now be described. In Fig. 2, the oven is shown to consist of outer walls 1 and inner walls 2 with suitable insulation therebetween. A hinged door 4 gives access to the interior of the oven proper.

Suitably mounted upon the bottom inner wall is a heating element 5 preferably, though not necessarily, of the electrical type, the temperature of the oven being maintained at a predetermined figure as indicated by a thermometer 6 having a scale 7.

Above the heating element 5 and mounted above a table 8 is a lower block or anvil 9. Extending through the anvil and socketed in the table 8 are a plurality of vertical rods 10, projecting upwardly a considerable extent. An upper jaw 11 is provided with sleeves 12 closely fitting the rods 9 so as to permit of an up and down movement with respect to the anvil 9, while maintaining the upper face of the anvil and the lower face of the upper jaw in substantial parallelism.

A crank shaft 13 terminating in a handle 14 outside of the oven, is journalled in a fixture 15 and has attached to the inner end thereof a crank 16 carrying stub shaft 17 on which arm 18 is mounted. The lower end of arm 18 is movably affixed to lugs 19 by pin 20. Pin 20 rides in an elongated slot 21 for a purpose more fully described hereinafter.

Figure 3:
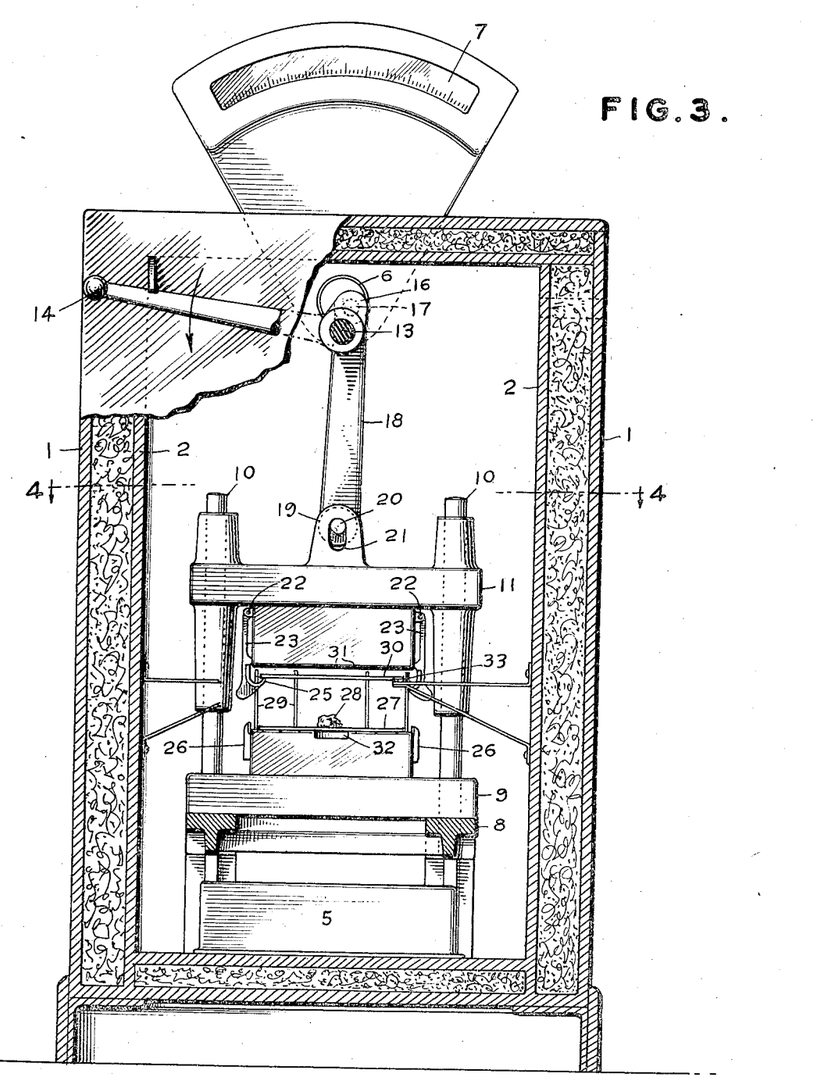
Fig. 3 is a front view partly in section along the line 3—3 of Fig. 2.
Figure 4:
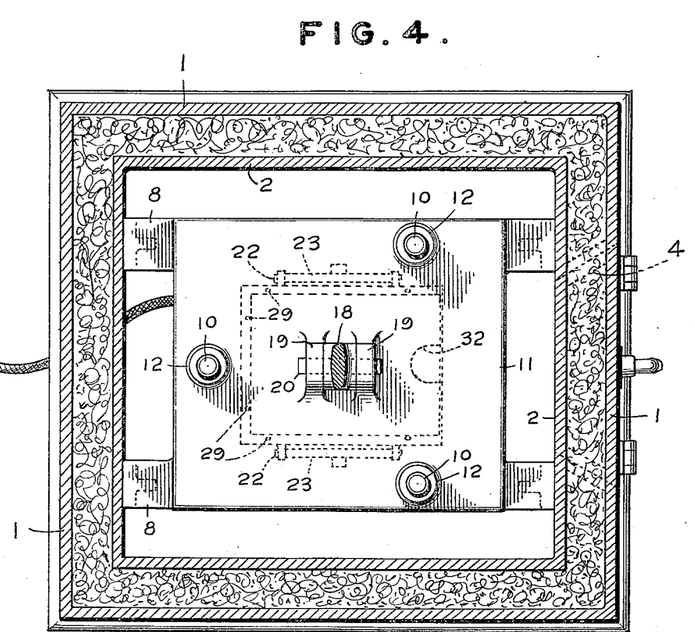
Fig. 4 is a sectional plan view along the line 4—4 of Fig. 3.

The parts above described are so arranged that when the handle 14 is moved to its upper position (Fig. 3) the upper jaw 11 is moved to its highest vertical position and will be maintained there by reason of the fact that the axis of shaft 17 is off the dead center between the axis of the crank arm 13 and the pin 20. Movement of the handle 14 in a counter clockwise direction will permit the upper jaw 11 to be lowered toward the anvil 9.

Figure 6:
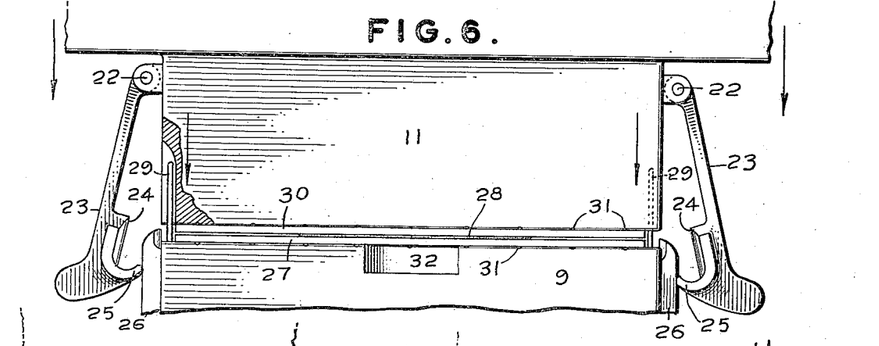

Swingably attached to opposite sides of the upper jaw 11 as by means of pins 22 are plate holders 23 having stops 24 and inwardly projecting fingers 25. Cams 26 secured to the sides of the anvil 9 are so arranged as to swing the plate holders outwardly around their pivots when the upper jaw is lowered as is shown in Fig. 6.

In operation, a plate 27 containing a measured quantity of resinous material 28 thereon is inserted through the opening closed by the door 4 until it rests upon the top of anvil 9. The latter is provided with upstanding retaining rods 29 at the sides and back thereof in order to accurately position the plate 27 and to prevent it from sliding off of the anvil.

A second glass plate 30 is slid along guides 33 into position beneath the bottom of the upper jaw 11 so that it rests upon the inwardly projecting fingers 25 of the plate holders 23. It is to be noted that the retaining rods 29 extend upwardly far enough so that they likewise prevent displacement of the upper plate 30 when pushed into position and during lowering upon the resin pellet 28.

Figure 5:
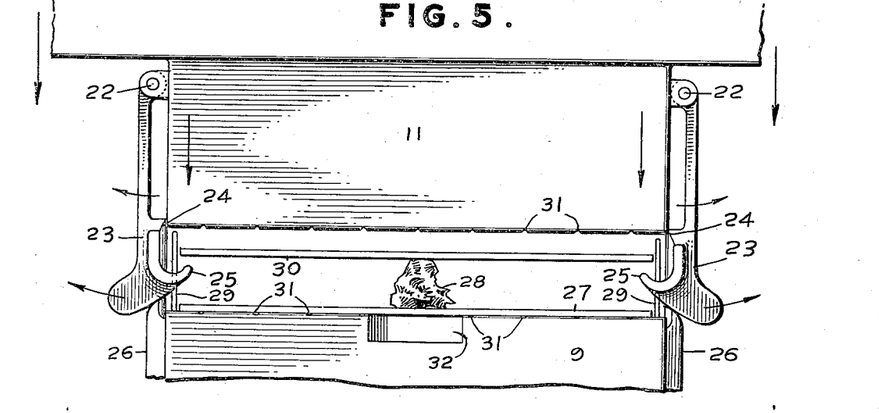
Figs. 5 and 6 are fragmentary front views of the upper and lower jaws in two approaching stages, showing the sample being filmed out.

If, now, the handle 14 is moved slowly in a counterclockwise direction, the upper jaw 11 and the plate 30 move downwardly until the upper plate hits the upper limit of the resin pellet 28 as shown in Fig. 5. Further downward movement of the upper jaw 11 continues until it contacts the upper plate 30, while the actual weight of the upper jaw 11 squeezes the resinous material 28 between the plates in the form of a film. Meanwhile, cams 26 have caused the plate holders 23 to move outwardly so as to move the fingers 25 from between the two plates, as shown in Fig. 6. At this point, and due to the fact that the pin 20 which supports the weight of the upper jaw 11 from the crank 16, is carried in an elongated slot 21. Further downward movement of the upper jaw 11 is permitted under the action of its own weight, thus spreading the resinous material into a film between the plates.

Figure 7:
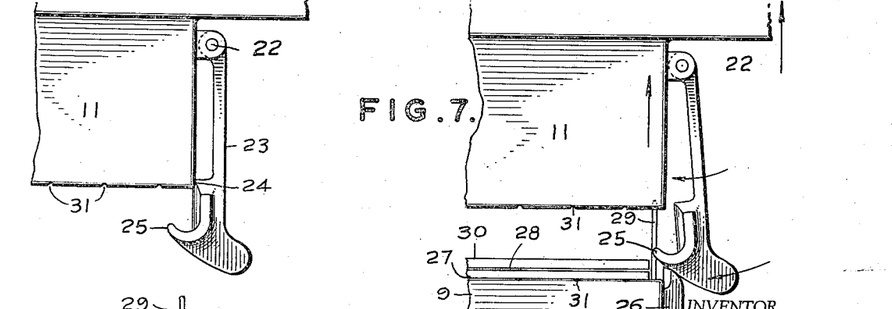
Fig. 7 is a similar view showing the upper jaw moving away from the lower jaw.
Figure 8:
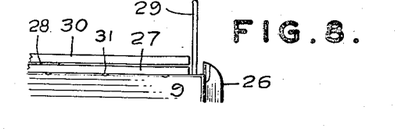
Fig. 8 shows the upper jaw in its highest position.

As has been set forth in some detail above in the discussion of the method employed, this weight is of the order of 4.5 kgs. and the temperature of the oven and the mechanism therein substantially 200° C. Due to the fact that the glass plates are comparatively thin, they quickly reach the temperature of the upper and lower jaws and, consequently, heat is readily transferred to the resin sample being tested. After being thus subjected to heat and pressure for a sufficient length of time, normally about five minutes, the sample may be removed as follows:

Clockwise movement of the handle 14 raises the upper jaw 11 as shown in Fig. 7 at the same time permitting the plate holders 23 to swing inwardly, the cams 26 causing fingers 25 to clear both plates. The bottom of the upper jaw 11 and the top of the anvil 9 are grooved slightly as at 31 to permit ready release of the plates therefrom. Further upward movement of the handle 14 to the position shown in Figs. 3 and 8 causes the upper jaw and its associated mechanism to sufficiently clear the plates so they may be readily removed. The plates may now be grasped at their front edges by forceps or chemical tongs, the lower jaw of which passes beneath the plate into the recess 32 (Figs. 3 and 6) and the plates withdrawn.

Figure 9:
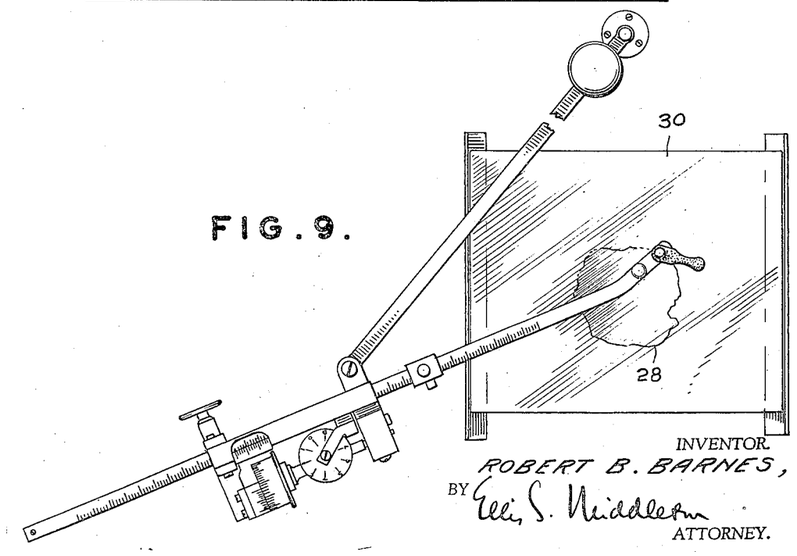
Fig. 9 is a plan view showing a method of reading a film area by means of a planimeter.

The plates with the resin sample spread therebetween as a film may then be placed in a suitable device where the area of the resin sample is automatically calculated as by a planimeter, all as illustrated diagrammatically in Fig. 9. Inasmuch as the planimeter is an ordinary article of commerce to which no claim is here made, it is only generally indicated.

While the invention has been shown and described with reference to particular steps in the process and mechanism has been shown whereby the process has been carried out, yet obviously I do not wish to limit it thereto but all equivalents are to be considered as coming within the scope of the claims.

I claim:

1. A method of preliminarily curing a heat-convertible resinous material which includes the following steps: quickly curing a plurality of individual samples taken at intervals of time from a batch of resinous material during the mixing and curing thereof under standardized heat and pressure in the form of films, measuring the areas of the individual films, plotting those figures against the time of processing and forming a curve from said plotting points and extrapolating from said curve the residual time necessary to reach the desired state of cure and continuing the curing treatment for the said residual time.

2. A method of preliminarily curing a heat-convertible resinous material which includes the following steps: squeezing out a predetermined weight of a resinous material under standardized heat and pressure, curing the thus formed film after it has reached its maximum extent, measuring the area of the film, plotting this figure against the time of processing, repeating the operations to form a series of plotting points and constructing a curve from such points and extrapolating from said curve the residual time necessary to reach the desired state of cure and continuing the curing treatment for the said residual time.

3. A method of preliminarily curing a heat-convertible resinous material which includes the following steps: forming a film of uniform thickness from a sample of the resinous material by applying standardized pressure thereto while being subjected to a standardized curing temperature, for a sufficient length of time that the resinous material is permitted to flow under those conditions to its maximum extent followed by curing, measuring the area of the film, plotting a multiple of that figure against the processing time at which the sample was taken, repeating the operations to secure a plurality of plotting points and forming a curve including said points and extrapolating from said curve the residual time necessary to reach the desired state of cure and continuing the curing treatment for the said residual time.

4. A method of preliminarily curing a heat-convertible resinous material which includes the following steps: taking a sample of the resinous material of the order of 0.25 gram, placing the same between horizontal surfaces, placing a weight thereon of the order of 4.5 kilograms while maintaining the temperature at substantially 200° C. for approximately five minutes, measuring the area of the thus formed film between the surfaces, squaring that figure, determining a plotting point using squared area units as the ordinate and the time of processing as the abscissa, repeating the operations to form a series of plotting points and constructing a curve through those points and extrapolating from said curve the residual time necessary to reach the desired state of cure and continuing the curing treatment for the said residual time.

5. A method of preliminarily curing a heat-convertible resinous material which includes the following steps: taking a sample of the resinous material of the order of 0.25 gram, placing the same between horizontal surfaces, placing a weight thereon of the order of 4.5 kilograms while maintaining the temperature at substantially 200° C. for approximately five minutes, measuring the area of the thus formed film between the surfaces, determining a plotting point by using that unit as the ordinate and the time of processing as the abscissa, repeating the operations to form a series of plotting points and constructing a curve through those points and extrapolating from said curve the residual time necessary to reach the desired state of cure and continuing the curing treatment for the said residual time.

ROBERT BOWLING BARNES.